United States Patent
Tuken et al.

(10) Patent No.: US 9,695,727 B2
(45) Date of Patent: Jul. 4, 2017

(54) SYSTEM AND METHOD FOR ADAPTIVE AFTERTREATMENT CONTROL OF $NO_x$

(71) Applicant: Deere & Company, Moline, IL (US)

(72) Inventors: Taner Tuken, Cedar Falls, IA (US); Robert J. Iverson, Waterloo, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 14/843,440

(22) Filed: Sep. 2, 2015

(65) Prior Publication Data
US 2017/0058740 A1   Mar. 2, 2017

(51) Int. Cl.
| | | |
|---|---|---|
| B01D 53/94 | (2006.01) | |
| F01N 3/18 | (2006.01) | |
| F01N 3/20 | (2006.01) | |
| F01N 11/00 | (2006.01) | |
| B01D 53/56 | (2006.01) | |

(52) U.S. Cl.
CPC ............ *F01N 3/208* (2013.01); *B01D 53/56* (2013.01); *B01D 53/9431* (2013.01); *B01D 53/9495* (2013.01); *F01N 11/007* (2013.01); *F01N 2550/05* (2013.01); *F01N 2610/02* (2013.01); *F01N 2610/146* (2013.01); *F01N 2900/0408* (2013.01); *F01N 2900/1806* (2013.01)

(58) Field of Classification Search
CPC ............ B01D 53/9418; B01D 53/9422; B01D 53/9495; B01D 2257/404; B01D 2258/012; F01N 3/206; F01N 3/2066; F01N 3/208; F01N 2390/00; F01N 2560/026; F01N 2610/02; F01N 2900/1402
See application file for complete search history.

(56) References Cited

U.S. PATENT DOCUMENTS

| | | |
|---|---|---|
| 5,540,047 A | 7/1996 | Dahlheim et al. |
| 6,378,515 B1 | 4/2002 | Geyer |
| 8,381,519 B2 | 2/2013 | Singh et al. |

(Continued)

FOREIGN PATENT DOCUMENTS

| | | |
|---|---|---|
| EP | 2339136 | 6/2011 |
| JP | 2003293743 | 10/2003 |
| WO | 2008078645 | 3/2008 |

OTHER PUBLICATIONS

EP16182425.5 Extended European Search Report dated Feb. 1, 2017 (9 pages).

*Primary Examiner* — Timothy Vanoy
(74) *Attorney, Agent, or Firm* — Michael Best & Friedrich LLP

(57) ABSTRACT

System and method of treating exhaust gas from an internal combustion engine using selective catalytic reduction (SCR) and adaptive control of diesel exhaust fluid (DEF) injection. Adaptive control of DEF injection includes intentionally underdosing the injected DEF based on an amount of DEF determined by an electronic control unit as an amount needed to reduce nitrogen oxides ($NO_x$) to a compliance threshold. Since underdosing prevents ammonia ($NH_3$) slip from occurring due to low levels of DEF, a sensor accurately senses $NO_x$ present in the exhaust gas at an output of an SCR chamber. An electronic control unit increases the amount of injected DEF based on the sensor.

18 Claims, 4 Drawing Sheets

(56) References Cited

U.S. PATENT DOCUMENTS

| | | |
|---|---|---|
| 8,463,531 B2 | 6/2013 | Ramappan et al. |
| 2003/0051468 A1 | 3/2003 | Van Nieuwstadt et al. |
| 2009/0301066 A1 | 12/2009 | Sindano et al. |
| 2010/0223907 A1 | 9/2010 | Walde et al. |
| 2011/0072798 A1 | 3/2011 | Herman |
| 2011/0239627 A1 | 10/2011 | Sisken et al. |
| 2014/0123629 A1 | 5/2014 | Singh et al. |
| 2015/0143884 A1* | 5/2015 | Heaton ................ F01N 3/2066 73/114.75 |

\* cited by examiner

SYSTEM AND METHOD FOR ADAPTIVE AFTERTREATMENT CONTROL OF $NO_x$

BACKGROUND

The present disclosure relates to exhaust systems and associated controls for regulating emissions through the use of selective catalytic reduction.

SUMMARY

Selective catalytic reduction (SCR) is a process for converting nitrogen oxides ($NO_x$) naturally produced in exhaust gas of an internal combustion engine. Since $NO_x$ are known to be harmful to the environment, SCR systems convert $NO_x$ into less harmful compounds before being released into the environment. SCR systems commonly use a diesel exhaust fluid (DEF) to act as a reducing agent, which, when combined with a catalyst, reduces the $NO_x$ in the exhaust gas. In some cases, DEF provides ammonia ($NH_3$) that acts as the reducing agent. However, to efficiently reduce $NO_x$, DEF is injected in varied amounts that depend on the $NO_x$ output of the engine. If DEF is over-injected, $NH_3$ may pass through the SCR catalyst untreated.

Due to increasingly stringent governmental regulations, diesel engines need to output fewer $NO_x$ emissions than previously required. At the same time, other factors, such as cost, reliability, and fuel consumption cause the engine to produce higher levels of $NO_x$. To achieve low average levels of $NO_x$ emissions, the SCR system may be controlled based on a low control setpoint for $NO_x$ emissions. However, as the SCR system increases the DEF injection rate, the increased flow of DEF may cause $NH_3$ slip (i.e., un-reacted ammonia passing through the SCR system).

In order to detect unreacted $NH_3$ at the output of the SCR catalyst, a sensor may be used that is designed specifically to detect only $NH_3$. However, this type of sensor is typically relatively expensive. Some types of $NO_x$ sensors are sensitive to both $NH_3$ and $NO_x$ and, therefore, a SCR control system could be implemented that measures both $NO_x$ (i.e., a DEF "underdose" condition) and $NH_3$ (i.e., a DEF "overdose") using the same sensor. Although such a system would be less costly to produce, it would be difficult to determine whether the output of the sensor is indicative of measured $NO_x$ (DEF underdose) or measured $NH_3$ (DEF overdose) in the treated exhaust gas moving through the tailpipe.

To provide for the costs savings associated with omitting an $NH_3$-specific sensor while providing certainty regarding whether the tailpipe sensor is measuring $NO_x$ or $NH_3$, embodiments described in this disclosure temporarily provide intentional underdosing of the DEF to ensure that $NH_3$ slip does not occur. As such, the SCR control system can operate under the assumption that the output of the tailpipe sensor is indicative of measured levels of $NO_x$ and that no appreciable amount of $NH_3$ is present in the tailpipe exhaust.

In one embodiment, the disclosure provides an exhaust gas treatment system for regulating $NO_x$ emissions in an internal combustion engine by injecting diesel exhaust fluid (DEF). The system includes an exhaust gas pathway that is configured to receive exhaust gas from the internal combustion engine. A DEF injector is configured to controllably inject DEF into the exhaust gas pathway. A selective catalytic reduction (SCR) chamber is positioned in line with the exhaust gas pathway and downstream of the DEF injector such that the exhaust gas and $NH_3$ provided by the DEF enter the SCR chamber at a first location. The exhaust gas and the $NH_3$ react to reduce $NO_x$ levels in the exhaust gas, and the $NO_x$-reduced exhaust gas exits the SCR chamber at a second location. A sensor is positioned downstream of the SCR chamber to monitor the $NO_x$-reduced exhaust gas leaving the SCR chamber, and the sensor is configured to provide an output indicative of an amount of ammonia ($NH_3$) and $NO_x$ in the $NO_x$-reduced exhaust without differentiating between amounts of $NH_3$ and amounts of $NO_x$. The system further includes an electronic control unit that is configured to underdose an amount of the DEF injected into the exhaust gas pathway, receive the output from the sensor, and compare the output to a threshold. The threshold is greater than zero meaning that some level of NOx will be allowed to pass through the tailpipe. The electronic control unit increases the amount of the DEF injected into the exhaust gas pathway if the output from the sensor exceeds the threshold.

In another embodiment, the disclosure provides a method of controlling an exhaust gas treatment system for regulating $NO_x$ emissions in an internal combustion engine by injecting diesel exhaust fluid (DEF). The method includes determining an amount of DEF to inject into an exhaust gas pathway based on a pretreatment sensor. The pretreatment sensor is configured to send a first signal to the electronic control unit indicative of an amount of $NO_x$ in the exhaust gas. The amount of the DEF being injected into the exhaust gas pathway is underdosed. A second signal from a sensor is received. The sensor is positioned downstream of a selective catalytic reduction (SCR) chamber and configured to provide the second signal indicative of an amount of $NO_x$ in the exhaust gas. The second signal is compared to a threshold with the threshold being greater than zero. The amount of injected DEF is increased if the second signal from the sensor exceeds the threshold.

Other features and aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or being carried out in various ways. Also, it is to be understood that the phraseology and terminology used herein is for the purpose of description and should not be regarded as limiting.

It should be noted that the term electronic control unit refers to hardware-based control circuitry integrated into an electronic control unit for executing instructions to perform the methods described herein. For example, the electronic control unit may include a microprocessor, microcontroller, or other computing device. The electronic control unit may include one or more electronic processing units, one or more memory modules including a non-transitory computer-readable medium, one or more input/output interfaces, one or more output drivers, one or more relays, and various connections (e.g., a system bus) connecting the components.

Figure 1:
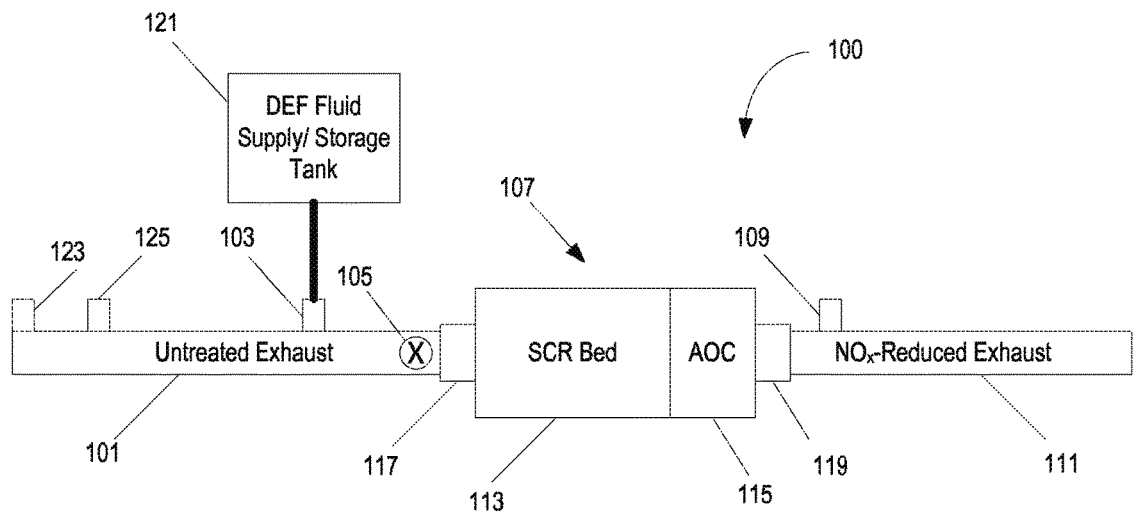
FIG. 1 is a schematic diagram of an exhaust aftertreatment system for an internal combustion engine.

FIG. 1 is an example of an exhaust gas aftertreatment system 100, which uses diesel exhaust fluid (DEF) to reduce nitrogen oxide ($NO_x$) emissions. DEF acts as a reductant (i.e., reducing agent) and may include, for example, anhydrous ammonia, aqueous ammonia, or urea. The exhaust gas aftertreatment system 100 includes an exhaust pathway 101 (e.g., an exhaust pipe) that includes a DEF injector 103, a mixer 105, a selective catalytic reduction reaction chamber (SCR chamber 107), a sensor 109, and a tailpipe 111. The SCR chamber 107 includes a selective catalytic reduction bed (SCR bed 113), an ammonia oxidizing catalyst (AOC 115), an inlet 117, and an outlet 119. The exhaust gas aftertreatment system 100 also includes a DEF supply 121, which includes a DEF tank to store DEF fluid. The DEF tank is fluidly connected to the DEF injector 103. The DEF supply 121 may include a variable pump or valve for controlling an amount of DEF sent to the DEF injector 103. The exhaust pathway 101 may be connected to an internal combustion engine (not illustrated) and configured to direct exhaust gas through the exhaust gas aftertreatment system 100. A pretreatment sensor 125 for detecting $NO_x$ is positioned upstream of the SCR chamber 107. Optional sensors 123 including a temperature sensor and an exhaust gas flow rate sensor may also be connected to the exhaust pathway 101 for monitoring the characteristics of the exhaust gas in some implementations. Although illustrated upstream of the DEF injector 103, the optional sensors 123 may be positioned in alternative locations including downstream of the SCR chamber 107 or between the DEF injector 103 and the SCR chamber 107. The outlet 119 of the SCR chamber 107 is connected to the tailpipe 111, which emits treated exhaust gas from the exhaust gas aftertreatment system 100.

In operation, exhaust gas from the internal combustion engine is directed into the exhaust pathway 101. The DEF injector 103 is located downstream of an inlet of the exhaust pathway 101. The DEF injector 103 injects DEF from the DEF supply 121 into the exhaust pathway 101. The DEF supply 121 controls the rate at which the DEF is injected into the exhaust gas. The DEF supply 121 may control the rate of injected DEF through various mechanisms including, for example, a variable pump or a variable control valve. The amount of DEF to be injected is determined by a DEF dosing algorithm. As described in further detail below, in some embodiments, the DEF dosing algorithm determines an amount of DEF to inject based on feedback from the tailpipe sensor and, in some other embodiments, the DEF dosing algorithm determines an amount of DEF to inject using open-loop control based on the measured output of the optional sensors 123.

Ammonia ($NH_3$) from the injected DEF and the exhaust gas are mixed in the mixer 105 downstream from the DEF injector 103. After mixing, the exhaust gas and $NH_3$ enter the SCR chamber 107. Inside the SCR chamber 107, the $NH_3$ and the SCR bed 113 react with NO in the exhaust gas. $NO_x$ is converted based on the amount of $NH_3$ present. Any excess $NH_3$ would be treated in the AOC 115 of the SCR chamber 107 before the exhaust gas is emitted from the exhaust pathway 101. Downstream of the SCR chamber 107, the sensor 109 senses a composition of the exhaust gas.

In some embodiments, the sensor 109 may be a $NO_x$ sensor that is designed primarily to detect $NO_x$ within the exhaust gas, but that is also sensitive to $NH_3$. Therefore, the sensor 109 reacts to amounts of both $NO_x$ and $NH_3$ present in the exhaust gas and produces a signal indicative of an amount of both $NO_x$ and $NH_3$. In the system of FIG. 1, it is unlikely that any appreciable amount of $NO_x$ will be present in the tailpipe during a DEF overdose, because the $NH_3$ provided by the excessive injected DEF will fully react with the $NO_x$ present in the untreated exhaust leaving only $NH_3$ in the treated tailpipe exhaust. Conversely, it is unlikely that any appreciable amount of $NH_3$ will be present in the tailpipe during a DEF underdose, because all of the $NH_3$ provided by the injected DEF will fully react with the $NO_x$ present in the untreated exhaust leaving only the excessive amount of unreacted $NO_x$ in the tailpipe exhaust. Therefore, although an increase in either $NO_x$ or $NH_3$ will increase the magnitude of the signal of the sensor 109, the output signal of the sensor 109 will generally be indicative of only $NH_3$ or $NO_x$. Furthermore, due to the intentional underdosing mechanism described below, the ECU 200 in the system of FIG. 2 is able to assume that the output signal of sensor 109 is generally indicative of levels of $NO_x$ in the tailpipe exhaust.

Figure 2:
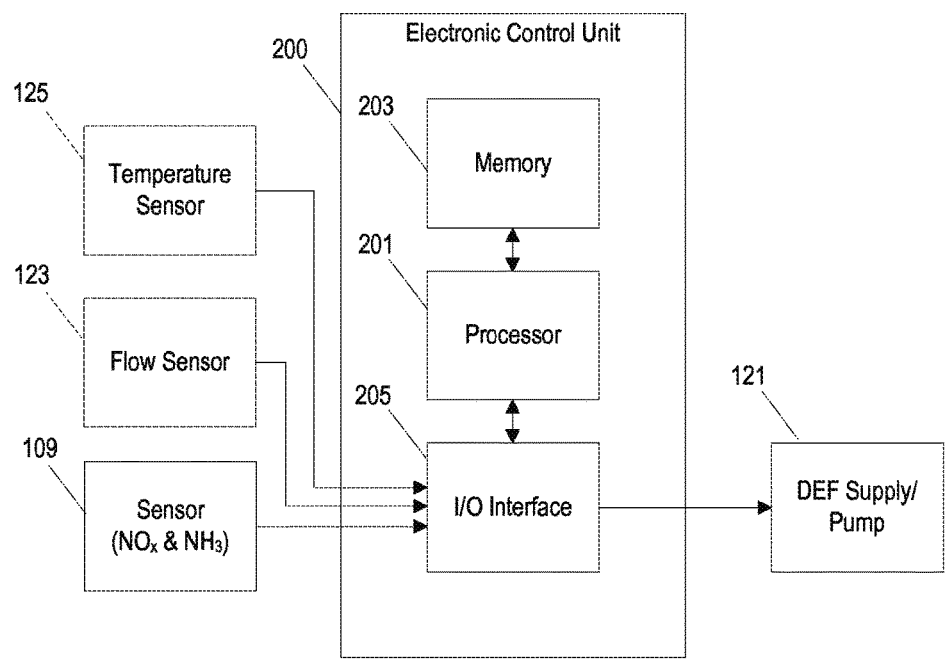
FIG. 2 is a block diagram of an electronic control unit for the exhaust aftertreatment system of FIG. 1.

FIG. 2 illustrates an example of an electronic control unit (ECU 200) for control of the exhaust gas aftertreatment system 100. The ECU 200 includes a plurality of electrical and electronic components that provide power, operational control, and protection to the components and modules within the ECU 200. In particular, the ECU 200 includes, among other things, an electronic processor 201 (e.g., a programmable microprocessor, microcontroller, or similar device), non-transitory, machine-readable memory 203, and an input/output interface 205. The electronic processor 201 is communicatively coupled to the memory 203. The electronic processor 201 is configured to retrieve from memory 203 and execute, among other things, instructions related to the control processes and methods described herein. In particular, the electronic processor 201 executes a program or algorithm stored in memory 203 to perform the methods illustrated in FIGS. 3-5. In other embodiments, the ECU 200 includes additional, fewer, or different components. The ECU 200 may also be configured to communicate with external systems including, for example, engine controls and/or operator controls.

The ECU 200 is communicatively coupled to the sensor 109, the DEF supply 121, the optional sensors 123, and the pretreatment sensor 125. The ECU 200 receives a signal input from the sensor 109 indicative of the amount of $NO_x$ and $NH_3$ present in the tailpipe exhaust gas. When the optional sensors 123 are present, the ECU 200 adjusts control of the DEF supply depending on the temperature of the exhaust gas and the flow rate of the exhaust gas. The input/output interface 205 facilitates communications between the ECU 200 and the DEF supply 121. Through the input/output interface 205, the ECU 200 sets the DEF supply 121 to obtain a desired dosing of DEF. The input/output interface 205 also coordinates input communications to the ECU 200 from the sensor 109, the optional sensors 123, and the pretreatment sensor 125.

Figure 3:
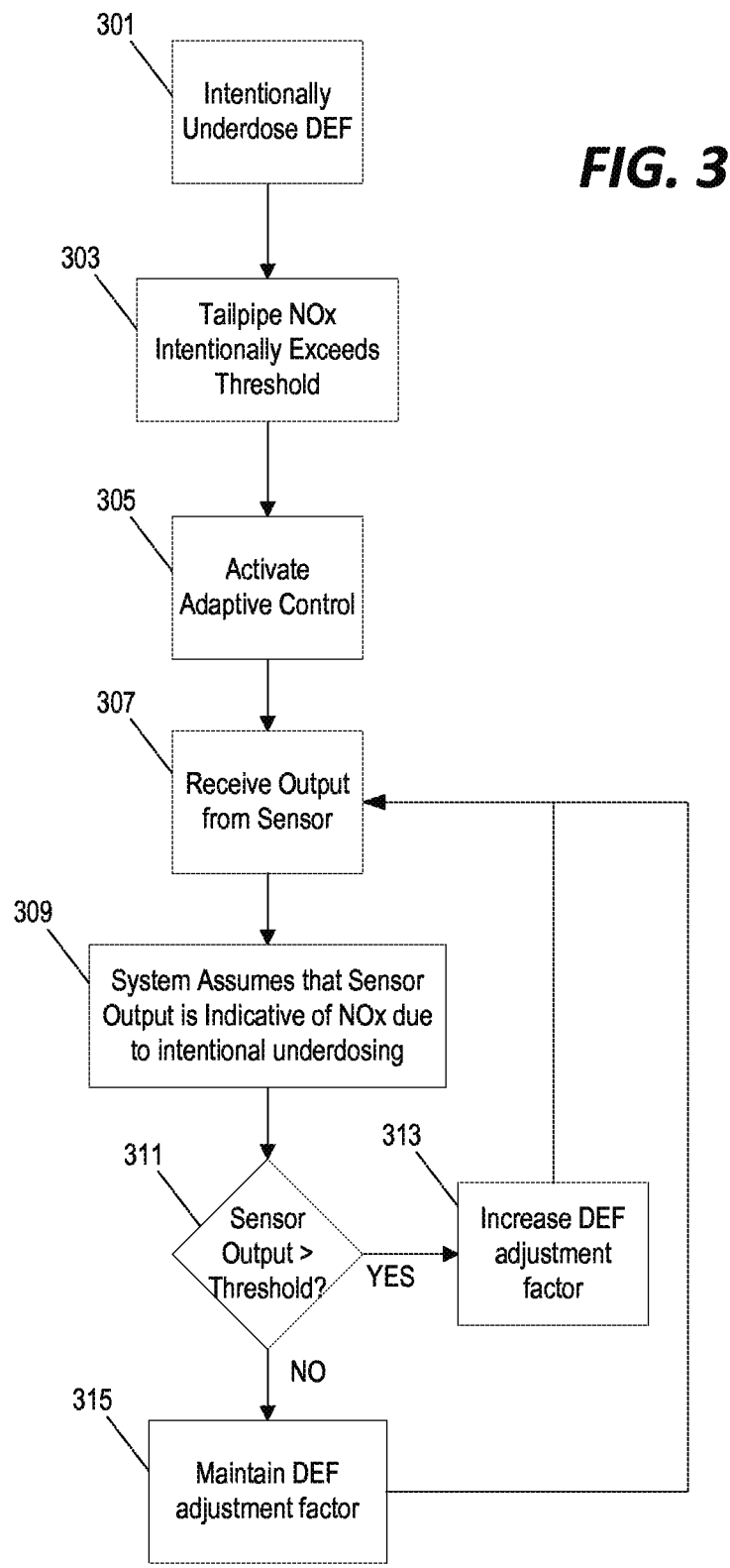
FIG. 3 is a flowchart of an adaptive control method for the exhaust gas aftertreatment system of FIG. 1 at start-up of the engine.
Figure 4:
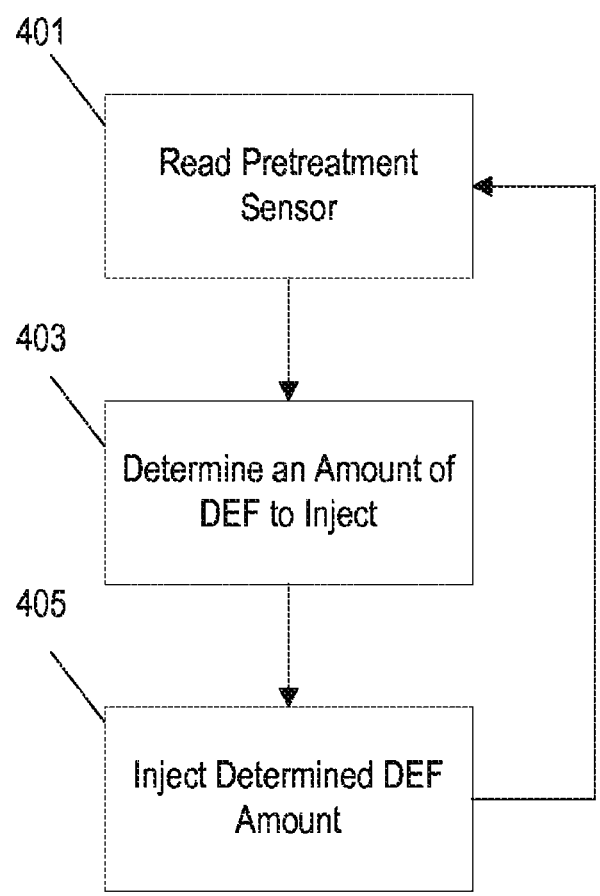
FIG. 4 is a flowchart of a method of using open-loop control to determine an amount of DEF to inject into the exhaust system (i.e., a DEF dosing algorithm).

FIG. 3 is an example of an adaptive control method for the exhaust gas aftertreatment system 100. The ECU 200 first determines an amount of DEF to inject based on an open-loop control architecture (as shown in FIG. 4) and intentionally underdoses the exhaust system based on that determined amount of DEF to inject (step 301). An amount of underdosing may be set based on a predetermined amount of DEF or based on an amount of DEF below the determined amount of DEF. The predetermined amount may be a percentage of the determined amount (e.g., approximately 20 percent less than determined amount). Underdosing forces the "treated" exhaust gas in tailpipe 111 to temporarily exceed a $NO_x$ threshold, such as, for example, a threshold equaling a maximum $NO_x$ emission standard (step 303). The ECU 200 then activates an adaptive control mechanism that adjusts the DEF dosing algorithm based on the output of the tailpipe sensor 109 (step 305). The ECU 200 reads the output from the sensor 109 (step 307) and, due to the intentional underdosing, the ECU 200 is able to assume that the output signal of the tailpipe sensor 109 is indicative of an amount of $NO_x$ in the tailpipe exhaust (step 309). As discussed above, no appreciable levels of $NH_3$ will be present in the tailpipe during a DEF underdose condition.

The ECU 200 determines if the sensor output (i.e., the measured $NO_x$) is greater than a threshold (step 311). The threshold may be, for example, an amount of $NO_x$ that is close to or below a maximum $NO_x$ emission standard. However, to ensure that underdosing of DEF is maintained and that the output signal of the $NO_x$ sensor remains indicative of $NO_x$ levels, the NO threshold must be greater than zero. When the sensor output is greater than the threshold, the ECU 200 increases an adjustment factor to increase the DEF dosing (step 313) thereby reducing the levels of $NO_x$ in the tailpipe exhaust. In one embodiment, when the sensor output is less than the threshold (i.e., $NO_x$ levels are less than the threshold and in compliance with emission standards), the ECU 200 maintains the last determined adjustment factor (step 315). In another embodiment, when the sensor output is less than the threshold, the ECU 200 slowly decreases (i.e., performs bleeding of) the adjustment factor. After determining the adjustment factor, the ECU 200 stores the adjustment factor in memory 203. The ECU 200 may apply the adjustment factor at the next startup of the engine. In this way, even though the ECU 200 initially sets an underdose condition (step 301), the adjustment factor is applied to successive startups (step 305) thus preventing $NO_x$ from exceeding compliance levels.

It should be noted, that intentional underdosing may be performed in a variety of ways. For example, underdosing may be, as explained above, determined based on a set amount below an optimal value of DEF. In other words, the ECU 200 maintains, while underdosing, an approximately non-zero amount of $NO_x$ in the exhaust gas. In addition, the ECU 200 is further configured to regulate the exhaust gas treatment system such that an amount of $NO_x$ in the exhaust gas is above a maximum limit for $NO_x$ emissions, at least initially, while underdosing. Underdosing may be performed briefly, as a transient condition upon start-up of the internal combustion engine. The amount of underdosing may also be variable. In such a case, the amount of underdosing may decrease over time until the DEF dosing equals the optimal value. Underdosing may also include completely shutting off the supply of DEF. By underdosing the DEF, the ECU 200 ensures that the sensor 109 is sensing levels of $NO_x$ rather than levels of $NH_3$ before the signal of the sensor 109 is used in control routines.

As discussed above, a DEF dosing algorithm is used during operation of the engine to regulate the amount of DEF that is injected into the exhaust pathway. In some implementations, the DEF dosing algorithm uses closed-loop feedback to adjust the amount of injected DEF based on the measured amount of $NO_x$ in the tailpipe exhaust (i.e., the output of the tailpipe sensor 109). However, other implementations may utilize an open-loop control mechanism such as illustrated in FIG. 4. In such an implementation, the adjustment factor would be considered when determining an amount of DEF to inject.

As shown in FIG. 4, the ECU 200 reads the pretreatment sensor 125 to determine an amount of $NO_x$ present at the output of the engine (i.e., before exhaust aftertreatment) (step 401). Because the pretreatment sensor 125 is positioned upstream of the DEF injector 103, the ECU 200 is programmed to assume that there is no appreciable amount of $NH_3$ measured by the pretreatment sensor 125 and, therefore, the output signal of the pretreatment sensor 125 is indicative solely of the amount of $NO_x$ present in the untreated exhaust gas. Based on the amount of $NO_x$ at the output of the engine, the ECU 200 estimates an optimal amount of DEF that is needed to reduce $NO_x$ emissions to an acceptable level (e.g., a compliance threshold) (step 403). In some embodiments, the open-loop control mechanism also measures and accounts for other factors when determining an appropriate DEF dosing strategies including, for example, exhaust gas temperature, exhaust gas flow-rate, temperature of the SCR bed 113, ambient air temperature, age of the SCR bed 113, and an amount of DEF remaining in the DEF supply tank 121. In some embodiments, the ECU 200 determines the optimal DEF dosing by reading a predetermined value from memory 203 based on the signal from the pretreatment sensor 125. In such a case, the ECU 200 may set the DEF dosing based on a lookup table in the memory 203. Once a dosing strategy is determined, the ECU 200 sends a control signal to the DEF supply to adjust the level of injected DEF (step 405).

Figure 5:
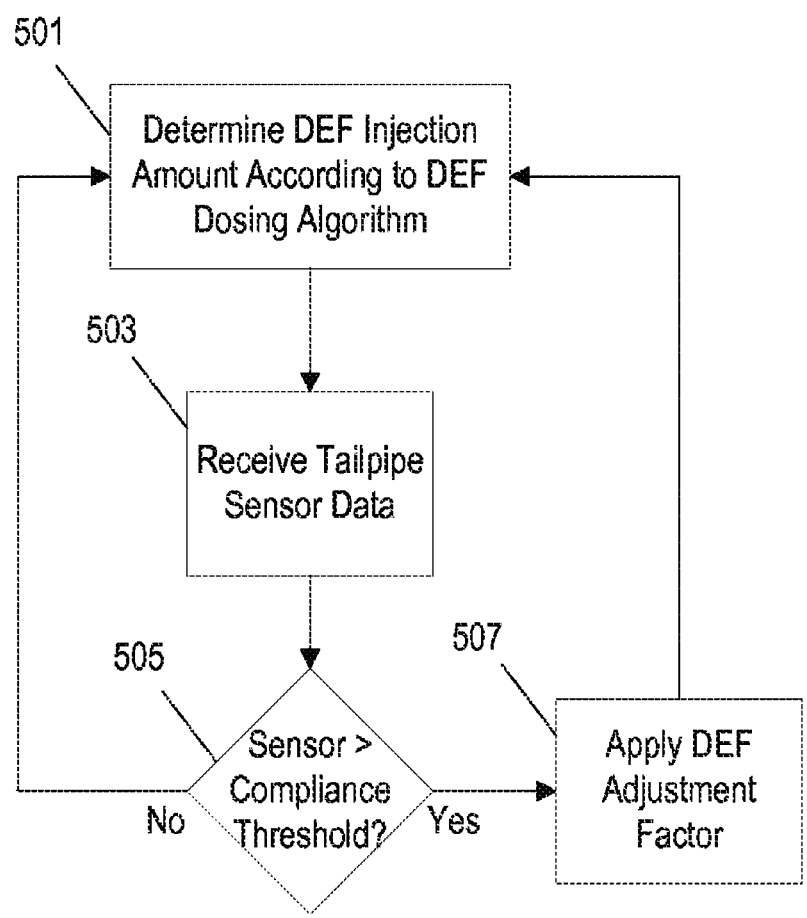
FIG. 5 is a flowchart of a method for applying adaptive DEF control to the DEF dosing algorithm of FIG. 4.

In some implementations, the adaptive DEF control mechanism is not limited to system start-up scenarios. FIG. 5 illustrates a method of adjusting a DEF dosing algorithm, such as the example illustrated in FIG. 4, based on an adaptive control mechanism. However, in some implementations, the use of an adaptive control mechanism to adjust the DEF dosing algorithm, such as the one illustrated in FIG. 4, may be delayed by the ECU 200 to enable the engine to start-up and the flow of exhaust gas to stabilize before performing the adjustment.

When the adaptive control mechanism is applied by the ECU 200 to monitor and augment the DEF dosing algorithm, the ECU 200 first determines a DEF injection amount based on the DEF dosing algorithm (e.g., the method of FIG. 4) (step 501). The ECU 200 then reads the signal from the tailpipe sensor 109 indicative of an amount of $NO_x$ present in the "treated" tailpipe exhaust (step 503). Again, due to the intentional underdosing described above, the ECU 200 is configured to assume that the signal from the tailpipe sensor 109 indicates the amount of NO that is passing untreated through the SCR chamber 107. The ECU 200 compares the signal of the sensor 109 to a compliance level (step 505), which may be set based on a maximum amount of $NO_x$ emissions allowed by any applicable emissions regulation standard. When the signal of the sensor 109 indicates an amount of $NO_x$ greater than the compliance threshold, the ECU 200 determines that the DEF dosing algorithm is not effectively regulating $NO_x$ emissions and, therefore, the ECU 200 applies the DEF adjustment factor to increase the supply of the DEF (step 507). Conversely, when the signal of the sensor 109 indicates an amount of $NO_x$ less than the compliance threshold, the ECU 200 determines that $NO_x$ emissions are being effectively regulated by the DEF dosing algorithm and, as such, the ECU 200 does not adjust the supply of DEF or the DEF dosing algorithm.

Thus, this disclosure provides, among other things, systems and methods for regulating an injected amount of DEF to treat $NO_x$ emissions and to prevent $NH_3$ slip without using a specialized $NH_3$ sensor by implementing an intentional underdosing and adaptive DEF control mechanism. Various features of the disclosure are set forth in the following claims.

What is claimed is:

1. An exhaust gas treatment system for regulating $NO_x$ emissions in an internal combustion engine including diesel exhaust fluid (DEF), the system comprising:
    an exhaust gas pathway that is configured to receive exhaust gas from the internal combustion engine;
    a DEF injector configured to controllably inject DEF into the exhaust gas pathway;
    a selective catalytic reduction (SCR) chamber positioned in line with the exhaust gas pathway such that the exhaust gas and ammonia ($NH_3$) both enter the SCR chamber at a first location, the exhaust gas and the $NH_3$ react within the SCR chamber to reduce NO levels in the exhaust gas, and the $NO_x$-reduced exhaust gas exits the SCR chamber at a second location;
    a first sensor positioned downstream of the SCR chamber to monitor the $NO_x$-reduced exhaust gas leaving the SCR chamber, the sensor being configured to provide an output indicative of an amount of $NH_3$ and $NO_x$ in the $NO_x$-reduced exhaust without differentiating between amounts of $NH_3$ and amounts of $NO_x$; and
    an electronic control unit configured to
        underdose an amount of the DEF injected into the exhaust gas pathway,
        receive the output from the sensor,
        compare the output to a threshold, the threshold being greater than zero, and
        increase the amount of the DEF injected into the exhaust gas pathway if the output from the sensor exceeds the threshold.

2. The exhaust gas treatment system of claim 1, further comprising:
    a DEF supply communicatively coupled to the electronic control unit, the DEF supply including a DEF tank configured to store DEF,
    wherein the DEF tank is fluidly connected to the DEF injector, and
    wherein the DEF supply is configured to adjust the amount of DEF that is injected into the exhaust system.

3. The exhaust gas treatment system of claim 1, wherein the SCR chamber includes a SCR catalyst and an ammonia oxidizing catalyst.

4. The exhaust gas treatment system of claim 1, wherein the sensor is a nitrogen oxide ($NO_x$) sensor that also reacts to a presence of $NH_3$.

5. The exhaust gas treatment system of claim 1, wherein the electronic control unit is further configured to maintain a non-zero amount of $NO_x$ in the exhaust gas.

6. The exhaust gas treatment system of claim 1, wherein, while underdosing, the electronic control unit is further configured to regulate the exhaust gas treatment system such that an amount of $NO_x$ in the exhaust gas is above a maximum limit for $NO_x$ emissions.

7. The exhaust gas treatment system of claim 1, further comprising a second sensor positioned upstream of the SCR chamber and configured to detect amounts of $NO_x$, wherein the electronic control unit is configured to determine the underdosed amount of DEF to inject into the exhaust gas pathway based on an open-loop control based on an output of the second sensor.

8. The exhaust gas treatment system of claim 1, wherein the electronic control unit is further configured to estimate an amount of DEF to inject based on a compliance threshold, and wherein the electronic control unit is configured to underdose the amount of DEF by setting the amount of DEF injected into the exhaust gas pathway to approximately 20 percent less than the estimated amount of DEF.

9. The exhaust gas treatment system of claim 1, wherein the electronic control unit is further configured to estimate an amount of DEF to inject, and wherein increasing the amount of the DEF injected into the exhaust gas pathway if the output from the sensor exceeds the threshold further includes increasing an adjustment factor for the amount of DEF to inject.

10. A method of controlling an exhaust gas treatment system for regulating $NO_x$ emissions in an internal combustion engine including diesel exhaust fluid (DEF), the method comprising:
    determining an amount of DEF to inject into an exhaust gas pathway based on a pretreatment sensor, the pretreatment sensor configured to send a first signal to an electronic control unit indicative of an amount of $NO_x$ in pretreatment exhaust gas;
    underdosing the amount of the DEF being injected into the exhaust gas pathway,
    receiving a second signal indicative of an amount of $NO_x$ in tailpipe exhaust gas from a tailpipe sensor, the tailpipe sensor being positioned downstream of a selective catalytic reduction (SCR) chamber;
    compare the second signal to a threshold, the threshold being greater than zero, and
    increase the amount of injected DEF into the exhaust gas pathway if the second signal from the sensor exceeds the threshold.

11. The method of controlling an exhaust gas treatment system according to claim 10, further comprising:
    sending a control signal to a DEF supply, the DEF supply including a DEF tank configured to store DEF, to adjust the amount of DEF that is injected into the exhaust gas pathway.

12. The method of controlling an exhaust gas treatment system according to claim 10, further comprising detecting an exhaust gas temperature and an exhaust gas flow rate.

13. The method of controlling an exhaust gas treatment system according to claim 10, wherein the sensor is a nitrogen oxide ($NO_x$) sensor.

14. The method of controlling an exhaust gas treatment system according to claim 10, further comprising maintaining a non-zero amount of $NO_x$ in the exhaust gas.

15. The method of controlling an exhaust gas treatment system according to claim 10, further comprising, while underdosing, regulating the exhaust gas treatment system such that an amount of $NO_x$ in the exhaust gas is above a maximum limit for $NO_x$ emissions.

16. The method of controlling an exhaust gas treatment system according to claim 10, further comprising determining the amount of underdosed, injected DEF based partly on open-loop control using a $NO_x$ reading from an $NO_x$ sensor positioned upstream of the SCR chamber.

17. The method of controlling an exhaust gas treatment system according to claim 10, further comprising estimating an amount of DEF to inject, and wherein underdosing the amount of DEF includes setting the amount of DEF to approximately 20 percent less than the estimated amount.

18. The method of controlling an exhaust gas treatment system according to claim 10, further comprising estimating an amount of DEF to inject, and wherein increasing the amount of the DEF injected into the exhaust gas pathway if the output from the sensor exceeds the threshold, further includes increasing an adjustment factor for the amount of DEF to inject.

* * * * *